(12) United States Patent
Fischer

(10) Patent No.: US 10,184,475 B2
(45) Date of Patent: Jan. 22, 2019

(54) FLUID PUMP WITH FLOW IMPEDANCE MEMBER

(71) Applicant: DELPHI TECHNOLOGIES IP LIMITED, St. Michael (BB)

(72) Inventor: John G. Fischer, Goodrich, MI (US)

(73) Assignee: DELPHI TECHNOLOGIES IP LIMITED (BB)

( * ) Notice: Subject to any disclaimer, the term of this patent is extended or adjusted under 35 U.S.C. 154(b) by 417 days.

(21) Appl. No.: 14/803,568

(22) Filed: Jul. 20, 2015

(65) Prior Publication Data
US 2017/0023016 A1    Jan. 26, 2017

(51) Int. Cl.
| | |
|---|---|
| *H02K 5/20* | (2006.01) |
| *F04D 13/06* | (2006.01) |
| *F04D 13/08* | (2006.01) |
| *H02K 5/132* | (2006.01) |
| *F04D 5/00* | (2006.01) |
| *F02M 37/08* | (2006.01) |
| *F04D 29/047* | (2006.01) |
| *F04D 29/18* | (2006.01) |
| *F04D 29/52* | (2006.01) |
| *F04D 29/54* | (2006.01) |
| *F02M 37/04* | (2006.01) |
| *F02M 59/44* | (2006.01) |
| *F04D 3/00* | (2006.01) |

(52) U.S. Cl.
CPC ......... *F04D 13/0653* (2013.01); *F02M 37/08* (2013.01); *F04D 5/002* (2013.01); *F04D 5/008* (2013.01); *F04D 13/08* (2013.01); *F04D 29/0473* (2013.01); *F04D 29/188* (2013.01); *F04D 29/528* (2013.01); *F04D 29/548* (2013.01); *H02K 5/132* (2013.01); *H02K 5/20* (2013.01); *F02M 37/048* (2013.01); *F02M 59/44* (2013.01); *F04D 3/005* (2013.01); *F04D 13/06* (2013.01); *F04D 13/0606* (2013.01); *F04D 13/0646* (2013.01); *F04D 29/181* (2013.01)

(58) Field of Classification Search
CPC .... F04D 13/0653; F04D 13/08; F04D 29/548; F04D 29/528; H02K 5/132; H02K 5/12; H02K 5/20
See application file for complete search history.

(56) References Cited

U.S. PATENT DOCUMENTS

| | | | |
|---|---|---|---|
| 4,566,866 A * | 1/1986 | Kemmner | F02M 37/048 310/154.08 |
| 5,708,311 A * | 1/1998 | Claar | F04B 1/20 310/63 |

(Continued)

*Primary Examiner* — Bryan Lettman
(74) *Attorney, Agent, or Firm* — Joshua M. Haines

(57) ABSTRACT

A fluid pump includes an inlet for introducing fluid into the fluid pump and an outlet for discharging the fluid from the fluid pump. A motor is included having an armature which rotates about an axis The motor also has a stator which circumferentially surrounds the armature such that a fluid passage is defined radially between the armature and stator through which the fluid flows from the inlet to the outlet. A pumping arrangement is rotated by the armature and pumps the fluid from the inlet to the outlet A flow impedance member extends axially in the fluid passage which impedes circumferential flow of the fluid within the fluid passage, thereby generating a pressure gradient circumferentially within the fluid passage which applies a lateral force to the armature.

15 Claims, 5 Drawing Sheets

(56) References Cited

U.S. PATENT DOCUMENTS

| | | | | |
|---|---|---|---|---|
| 5,828,148 A * | 10/1998 | Niggemann | ............ | H02K 5/12 |
| | | | | 310/86 |
| 5,971,687 A * | 10/1999 | Ito | ........................ | F02M 37/048 |
| | | | | 411/238 |
| 6,402,460 B1 * | 6/2002 | Fischer | ................... | F04D 5/002 |
| | | | | 415/55.1 |
| 6,422,839 B1 * | 7/2002 | Brockner | ............. | F02M 37/048 |
| | | | | 310/87 |
| 6,435,810 B1 * | 8/2002 | Fischer | ............. | B29C 45/14795 |
| | | | | 415/55.1 |
| 6,499,941 B1 * | 12/2002 | Fischer | ................... | F04D 5/002 |
| | | | | 415/55.1 |
| 2004/0165981 A1 * | 8/2004 | Iijima | ................... | F04D 29/188 |
| | | | | 415/55.1 |
| 2008/0273990 A1 * | 11/2008 | Pham | ................... | F04D 29/061 |
| | | | | 417/53 |
| 2013/0315759 A1 * | 11/2013 | Hayakawa | ............... | H02K 3/46 |
| | | | | 417/420 |
| 2013/0320788 A1 * | 12/2013 | Sakai | ................ | H02K 11/0094 |
| | | | | 310/71 |

* cited by examiner

FLUID PUMP WITH FLOW IMPEDANCE MEMBER

TECHNICAL FIELD OF INVENTION

The present invention relates to a fluid pump; more particularly to a fuel pump; even more particularly to a fuel pump with an electric motor which rotates a pumping arrangement which pumps fuel through a fluid passage formed radially between an armature and a stator of the electric motor; and still even more particularly to such a fuel pump which includes a flow impedance member within the fluid passage, thereby generating a pressure gradient circumferentially within the fluid passage which applies a lateral force to the armature.

BACKGROUND OF INVENTION

Fluid pumps, and more particularly fuel pumps for pumping fuel, for example, from a fuel tank of a motor vehicle to an internal combustion engine of the motor vehicle, are known. United States Patent Application Publication No. US 2010/0047090 A1 to Marx et al. shows an example of such a fuel pump. It is known for fuel pumps to include an electric motor which rotates a pumping arrangement in order to pump fuel from an inlet of the fuel pump to an outlet of the fuel pump. The electric motor includes an armature with a shaft extending from each end thereof and rotationally coupled to the pumping arrangement such that opposing ends of the shaft are support by respective bearings. In use, the pumping arrangement may apply a side load to the shaft, consequently applying a side load to the interface between the shaft and the bearings. In order to provide suitable durability, it is necessary to use materials that are able to resist wear that results from the side load. Fuel pumps which have high side loading of the shaft may require the shaft and/or the bearing to be made of materials that tend to increase cost. Furthermore, the shaft may be allowed to wobble or oscillate laterally in the bearing as a result of the radial clearance between the shaft and the bearings. If the radial clearance is too large, the wobble or lateral oscillations of the shaft may generate noise and vibration that may be objectionable. In order to minimize lateral oscillations or wobble of the shaft, it is known to use very small clearances and tolerances between the shaft and the bearings which tend to increase manufacturing costs.

What is needed is a fuel pump which minimizes or eliminates one or more of the shortcomings as set forth above.

SUMMARY OF THE INVENTION

Briefly described, a fluid pump includes an inlet for introducing fluid into the fluid pump; an outlet for discharging the fluid from the fluid pump; a motor having an armature which rotates about an axis such that the armature is supported at one end by a first bearing and at second end by a second bearing, the motor also having a stator which circumferentially surrounds the armature such that a fluid passage is defined radially between the armature and stator through which the fluid flows from the inlet to the outlet; a pumping arrangement which is rotated by the armature and which pumps the fluid from the inlet to the outlet; a flow impedance member extending axially in the fluid passage which impedes circumferential flow of the fluid within the fluid passage, thereby generating a pressure gradient circumferentially within the fluid passage which applies a lateral force to the armature. The lateral force applied to the armature may be useful for decreasing the load between the shaft and the bearings, thereby minimizing the need for expensive materials that may be needed to accommodate higher loads. The later force applied to the armature may also be useful for minimizing noise that may result from the shaft oscillating laterally within the bearings, thereby minimizing the need to maintain costly small clearances and tolerances between the shaft and the bearings.

BRIEF DESCRIPTION OF DRAWINGS

This invention will be further described with reference to the accompanying drawings in which.

DETAILED DESCRIPTION OF INVENTION

Figure 1:
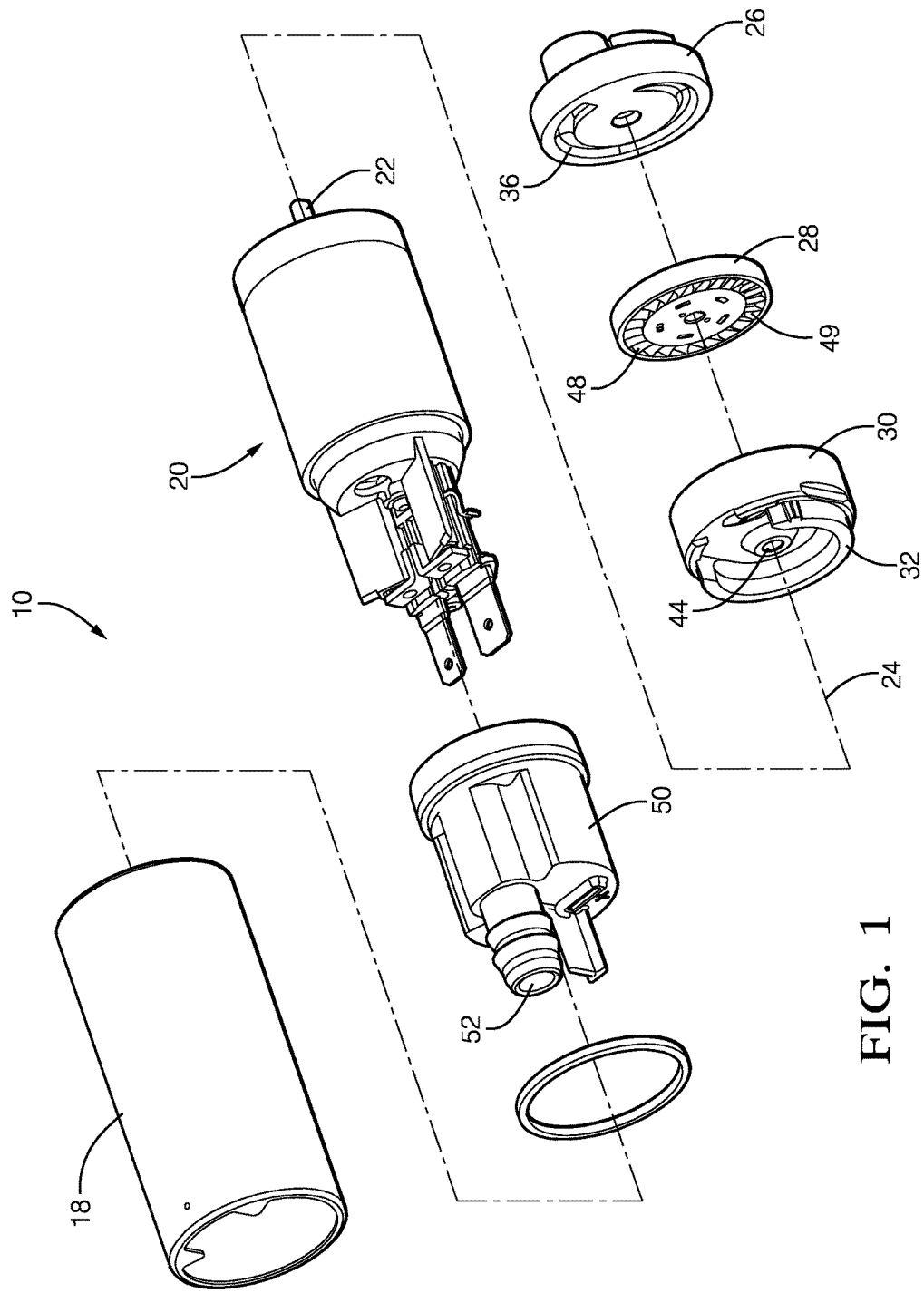
FIG. 1 is an exploded isometric view of a fuel pump in accordance with the present invention.
Figure 2:
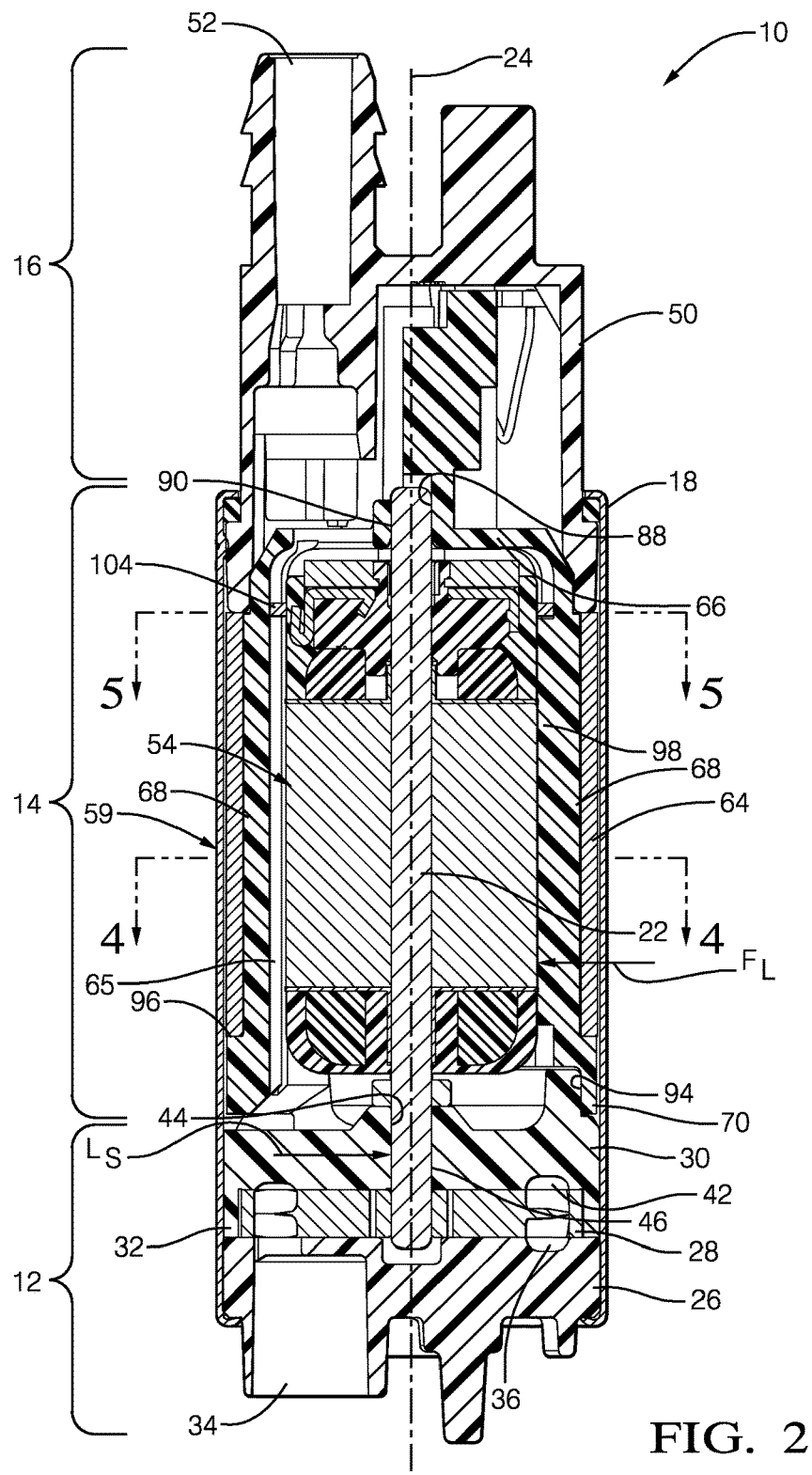
FIG. 2 is an axial cross-sectional view of the fuel pump in accordance with the present invention.

Reference will be made to FIGS. 1 and 2 which are an exploded isometric view and an axial cross-sectional view respectively of a fluid pump illustrated as fuel pump 10 for pumping liquid fuel, for example gasoline or diesel fuel, from a fuel tank (not shown) to an internal combustion engine (not shown). While the fluid pump is illustrated as fuel pump 10, it should be understood that the invention is not to be limited to a fuel pump, but could also be applied to fluid pumps for pumping fluids other than fuel. Fuel pump 10 generally includes a pump section 12 at one end, a motor section 14 adjacent to pump section 12, and an outlet section 16 adjacent to motor section 14 at the end of fuel pump 10 opposite pump section 12. A housing 18 of fuel pump 10 retains pump section 12, motor section 14 and outlet section 16 together. Fuel enters fuel pump 10 at pump section 12, a portion of which is rotated by motor section 14 as will be described in more detail later, and is pumped past motor section 14 to outlet section 16 where the fuel exits fuel pump 10.

Motor section 14 includes an electric motor 20 which is disposed within housing 18. Electric motor 20 includes a shaft 22 extending therefrom into pump section 12. Shaft 22 rotates about an axis 24 when an electric current is applied to electric motor 20. Electric motor 20 will be described in greater detail later.

With continued reference to FIGS. 1 and 2, pump section 12 includes an inlet plate 26, a pumping arrangement illustrated as impeller 28, and an outlet plate 30. Inlet plate 26 is disposed at the end of pump section 12 that is distal from motor section 14 while outlet plate 30 is disposed at the end of pump section 12 that is proximal to motor section 14. Both inlet plate 26 and outlet plate 30 are fixed relative to housing 18 to prevent relative movement between inlet plate 26 and outlet plate 30 with respect to housing 18. Outlet plate 30 defines a spacer ring 32 on the side of outlet plate 30 that faces toward inlet plate 26. Impeller 28 is disposed axially between inlet plate 26 and outlet plate 30 such that impeller 28 is radially surrounded by spacer ring 32. Impeller 28 is fixed to shaft 22 such that impeller 28 rotates with shaft 22 in a one-to-one relationship. Spacer ring 32 is dimensioned to be slightly thicker than the dimension of impeller 28 in the direction of axis 24, i.e. the dimension of spacer ring 32 in the direction of axis 24 is greater than the dimension of impeller 28 in the direction of axis 24. In this way, inlet plate 26, outlet plate 30, and spacer ring 32 are fixed within housing 18, for example by crimping the axial ends of housing 18. Axial forces created by the crimping process will be carried by spacer ring 32, thereby preventing impeller 28 from being clamped tightly between inlet plate 26 and outlet plate 30 which would prevent impeller 28 from rotating freely. Spacer ring 32 is also dimensioned to have an inside diameter that is larger than the outside diameter of impeller 28 to allow impeller 28 to rotate freely within spacer ring 32 and axially between inlet plate 26 and outlet plate 30. While the pumping arrangement has been illustrated as impeller 28, it should now be understood that other pumping arrangements may alternatively be used, by way of non-limiting example only, a gerotor, gears, or roller vanes. Furthermore, while spacer ring 32 is illustrated as being made as a single piece with outlet plate 30, it should be understood that spacer ring 32 may alternatively be made as a separate piece that is captured axially between outlet plate 30 and inlet plate 26.

Inlet plate 26 is generally cylindrical in shape, and includes an inlet 34 that extends through inlet plate 26 in the same direction as axis 24. Inlet 34 is a passage which introduces fuel into fuel pump 10. Inlet plate 26 also includes an inlet plate flow channel 36 formed in the face of inlet plate 26 that faces toward impeller 28. Inlet plate flow channel 36 is in fluid communication with inlet 34.

Outlet plate 30 is generally cylindrical in shape and includes an outlet plate outlet passage 40 that extends through outlet plate 30 in the same direction as axis 24. Outlet plate outlet passage 40 is in fluid communication with outlet section 16 as will be describe in more detail later. Outlet plate 30 also includes an outlet plate flow channel 42 formed in the face of outlet plate 30 that faces toward impeller 28. Outlet plate flow channel 42 is in fluid communication with outlet plate outlet passage 40. Outlet plate 30 also includes an outlet plate aperture, hereinafter referred to as lower bearing 44, extending through outlet plate 30. Shaft 22 extends through lower bearing 44 in a close fitting relationship such that shaft 22 is able to rotate freely within lower bearing 44 and such that radial movement of shaft 22 within lower bearing 44 is limited to the manufacturing tolerances of shaft 22 and lower bearing 44. In this way, lower bearing 44 radially supports a lower end 46 of shaft 22 that is proximal to pump section 12.

Impeller 28 includes a plurality of blades 48 arranged in a polar array radially surrounding and centered about axis 24 such that blades 48 are aligned with inlet plate flow channel 36 and outlet plate flow channel 42. Blades 48 are each separated from each other by a blade chamber 49 that passes through impeller 28 in the general direction of axis 24. Impeller 28 may be made, for example only, by a plastic injection molding process in which the preceding features of impeller 28 are integrally molded as a single piece of plastic.

Outlet section 16 includes an end cap 50 having an outlet 52 for discharging fuel from fuel pump 10. Outlet 52 may be connected to, for example only, a conduit (not shown) for supplying fuel to an internal combustion engine (not shown). Outlet 52 is in fluid communication with outlet plate outlet passage 40 of outlet plate 30 for receiving fuel that has been pumped by pump section 12.

Figure 3:
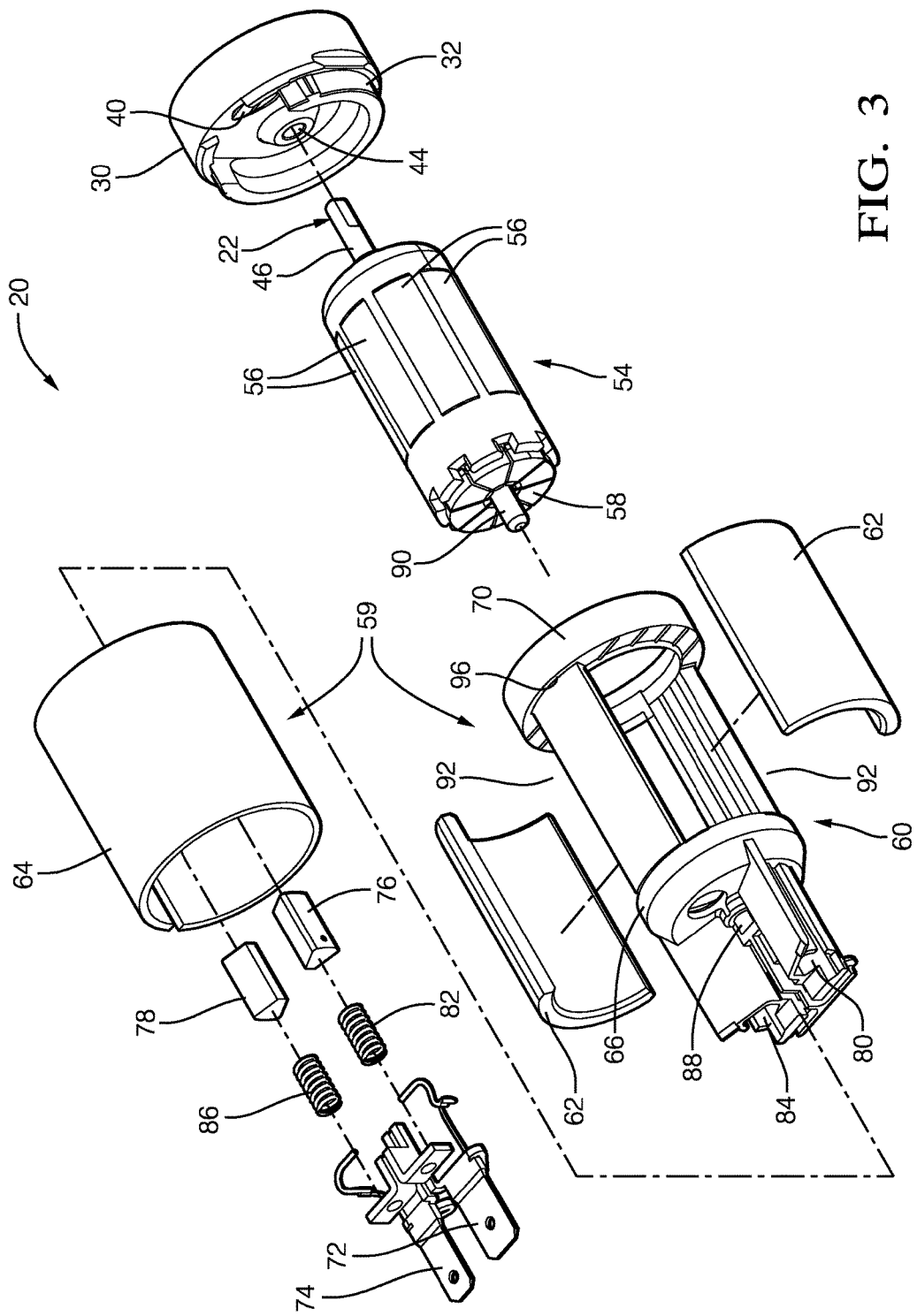
FIG. 3 is an exploded isometric view of a portion of the fuel pump in accordance with the present invention.
Figure 4:
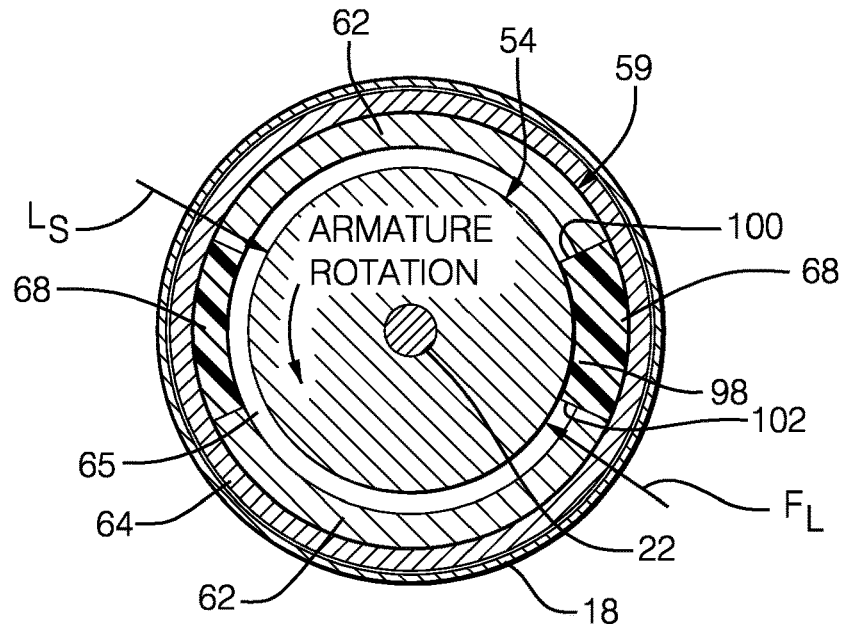
FIG. 4 is a radial cross-sectional view taken through section line 4-4 of FIG. 2.
Figure 5:
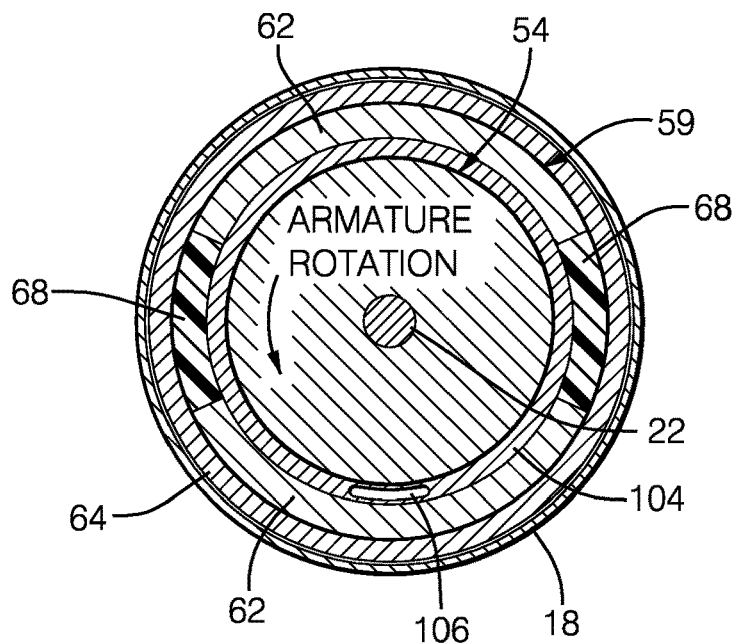
FIG. 5 is a radial cross-sectional view taken through section line 5-5 of FIG. 2.

With continued reference to FIGS. 1 and 2 and with additional reference to FIGS. 3-5, electric motor 20 includes a rotor or armature 54 with a plurality of circumferentially spaced motor windings 56, a commutator portion 58, and shaft 22 such that armature 54 rotates about axis 24. Electric motor 20 also includes a stator 59 with a motor frame 60, a pair of permanent magnets 62, and a flux carrier 64. Each magnet 62 is in the shape of a segment of a hollow cylinder. Stator 59 circumferentially surrounds armature 54 such that a fluid passage 65 is defined radially between armature 54 and stator 59 and such that fuel flows axially through fluid passage 65 from inlet 34 to outlet 52. In addition to flowing axially through fluid passage 65, rotation of armature 54 creates a viscous drag on the fuel within fluid passage 65 which causes the fuel to also flow circumferentially in the direction of rotation of armature 54. As oriented in FIGS. 4 and 5, armature 54 rotates counterclockwise, thereby causing a circumferential flow component on the fuel in the counterclockwise direction within fluid passage 65. Motor frame 60 includes a top section 66 that is proximal to outlet section 16, a plurality of circumferentially spaced legs 68 extending axially from top section 66 toward pump section 12, and a base section 70 axially spaced apart from top section 66 by legs 68. Top section 66, legs 68, and base section 70 are preferably integrally formed from a single piece of plastic, for example only, by a plastic injection molding process.

Top section 66 of motor frame 60 includes a first electrical terminal 72 and a second electrical terminal 74 extending therefrom and protruding through end cap 50. First electrical terminal 72 and second electrical terminal 74 are arranged to be connected to a power source (not shown) such that first electrical terminal 72 and second electrical terminal 74 are opposite in polarity. First electrical terminal 72 and second electrical terminal 74 may be disposed within pre-formed openings in top section 66 or first electrical terminal 72 and second electrical terminal 74 may be insert molded with top section 66 when motor frame 60 is formed by a plastic injection molding process. First electrical terminal 72 is in electrical communication with a first carbon brush 76 while second electrical terminal 74 is in electrical communication with a second carbon brush 78. First carbon brush 76 is disposed within a first brush holder 80 that is defined by top section 66 and is urged into contact with commutator portion 58 of armature 54 by a first brush spring 82 that is grounded to end cap 50. Second carbon brush 78 is disposed within a second brush holder 84 defined by top section 66 and is urged into contact with commutator portion 58 of armature 54 by a second brush spring 86 that is grounded to end cap 50. First carbon brush 76 and second carbon brush 78 deliver electrical power to motor windings 56 via commutator portion 58, thereby rotating armature 54 and shaft 22 about axis 24 in use.

Top section 66 of motor frame 60 defines an upper bearing 88 therein which radially supports an upper end 90 of shaft 22 that is proximal to outlet section 16. Shaft 22 is able to rotate freely within upper bearing 88 such that radial movement of shaft 22 within upper bearing 88 is limited to the manufacturing tolerances of shaft 22 and upper bearing 88.

Legs 68 are preferably equally circumferentially spaced around top section 66 and base section 70 and define motor frame openings 92 between legs 68. Motor frame openings 92 extend axially from top section 66 to base section 70. One magnet 62 is disposed within each motor frame opening 92 and magnets 62 may be inserted within respective motor frame openings 92 after motor frame 60 has been formed. Alternatively, magnets 62 may be insert molded with motor frame 60 when motor frame 60 is formed by a plastic injection molding process. In this way, magnets 62 and legs 68 radially surround armature 54. While two legs 68 and two magnets 62 have been illustrated, it should be understood that other quantities of legs 68 and magnets 62 may be used.

Base section 70 may be annular in shape and connects legs 68 to each other. Base section 70 includes a base section recess 94 extending axially thereinto from the end of base section 70 that faces away from top section 66. Base section recess 94 is coaxial with upper bearing 88 and receives outlet plate 30 closely therein such that radial movement of outlet plate 30 within base section recess 94 is substantially prevented. Since base section recess 94 is coaxial with upper bearing 88, a coaxial relationship is maintained between lower bearing 44 and upper bearing 88 by base section 70. Base section 70 also defines an annular shoulder 96 that faces toward top section 66. Annular shoulder 96 may be substantially perpendicular to axis 24.

Flux carrier 64 is made of a ferromagnetic material and may take the form of a cylindrical tube. Flux carrier 64 closely radially surrounds legs 68 of motor frame 60 and magnets 62. Flux carrier 64 may be made, for example only, from a sheet of ferromagnetic material formed to shape by a rolling process. The end of flux carrier 64 that is proximal to base section 70 of motor frame 60 axially abuts annular should 96 of base section 70 while the end of flux carrier 64 that is proximal to top section 66 of motor frame 60 axially abuts a portion of end cap 50 that radially surrounds top section 66 of motor frame 60. In this way, flux carrier 64 is captured axially between end cap 50 and annular shoulder 96 of base section 70.

Since motor frame 60 may be made as a single piece, for example only, by a plastic injection molding process, upper bearing 88 and base section recess 94 can be made by a single piece of tooling, thereby allowing a high degree of control over the relative positions of upper bearing 88 and base section recess 94. Consequently, lower bearing 44 can more easily be maintained in a coaxial relationship with upper bearing 88. Similarly, since first brush holder 80 and second brush holder 84 may be defined by top section 66, for example only, by an injection molding process, first brush holder 80, second brush holder 84, and upper bearing 88 may be formed by a single piece of tooling, thereby allowing a high degree of control over the relative positions of first brush holder 80, second brush holder 84, and upper bearing 88. Consequently, first brush holder 80 and second brush holder 84 can be easily maintained parallel to axis 24 which may be important for first carbon brush 76 and second carbon brush 78 to adequately interface with commutator portion 58 of armature 54.

In operation, inlet 34 is exposed to a volume of fuel (not shown) which is to be pumped to, for example only, an internal combustion engine (not shown). An electric current is supplied to motor windings 56 in order to rotate shaft 22 and impeller 28. As impeller 28 rotates, fuel is drawn through inlet 34 into inlet plate flow channel 36. Blade chambers 49 allow fuel from inlet plate flow channel 36 to flow to outlet plate flow channel 42. Impeller 28 subsequently discharges the fuel through outlet plate outlet passage 40 and consequently through outlet 52.

As described previously, rotation of armature 54 creates a viscous drag on the fuel within fluid passage 65 which causes the fuel to also flow in the direction of rotation of armature 54. The inventor has discovered that by impeding the flow of fuel in the direction of rotation of armature 54 within fluid passage 65, a lateral force can be applied to armature 54 which can be used to minimize side loading of shaft 22 on lower bearing 44 which may be the result of the interaction of impeller 28 pumping the fuel. Minimizing the side load, indicated by arrow $L_S$, on shaft 22 at lower bearing 44 increases the life of lower bearing 44 and may allow less costly materials and processes to be used to produce shaft 22 and lower bearing 44. In another independent use, the lateral force applied to armature 54 can be used to minimize noise and vibration that may result from armature 54 moving transverse relative to axis 24 as a result of clearance between shaft 22 and upper bearing 88 and between shaft 22 and lower bearing 44. Using the lateral force applied to armature 54 to minimize noise and vibration of armature 54 prevents the need for costly close tolerance clearances between shaft 22 and upper bearing 88 and between shaft 22 and lower bearing 44. The features used to impede the flow of fuel in the direction of rotation of armature 54 within fluid passage 65, thereby applying a lateral force to armature 54, will be described in the paragraphs that follow.

In order to impede the flow of fuel in the direction of rotation of armature 54 within fluid passage 65, a flow impedance member 98 is provided within fluid passage 65 such that flow impedance member 98 extends axially within fluid passage 65. Flow impedance member 98 may be fixed to stator 59, and may, by way of non-limiting example only, be integrally formed with one leg 68 of motor frame 60. Flow impedance member 98 extends radially into fluid passage 65 from stator 59 such that flow impedance member 98 is in close proximity to armature 54, thereby impeding the circumferential flow of fuel within fluid passage 65. Flow impedance member 98 defines an upstream face 100 from which the circumferential flow of fuel within fluid passage 65 flows away from and flow impedance member 98 also defines a downstream face 102 to which the circumferential flow of fuel within fluid passage 65 flows toward. By impeding the circumferential flow of fuel within fluid passage 65, a pressure gradient is generated circumferentially within fluid passage 65 where the lowest pressure occurs at upstream face 100 and the highest pressure occurs at downstream face 102. Consequently, a lateral force indicated by arrow $F_L$, is applied to armature 54. Flow impedance member 98 may be designed to have a length and to have a radial clearance with armature 54 which produces a desired magnitude of lateral force $F_L$ to achieve a desired effect. When the desired effect is to offset side load $L_S$ and reduce the contact force between shaft 22 and lower bearing 44, flow impedance member 98 is positioned within fluid passage 65 to allow lateral force $F_L$ to substantially oppose side load $L_S$ with a magnitude that reduces the contact force between shaft 22 and lower bearing 44. When the desired effect is to prevent shaft 22 from moving laterally within upper bearing 88 and lower bearing 44, the location of flow impedance member 98 within fluid passage 65 may be less important, however, the magnitude of lateral force $F_L$ must be sufficient to exceed and suppress the rotational imbalance of armature 54 which tends to cause shaft 22 to oscillate laterally within the clearance between shaft 22 and upper bearing 88 and between shaft 22 and lower bearing 44, i.e. lateral force $F_L$ must be sufficient to cause shaft 22 to be held against a particular radial location of upper bearing 88 and lower bearing 44. Furthermore, when the desired effect is to prevent shaft 22 from moving laterally within upper bearing 88 and lower bearing 44, flow impedance member 98 may be located within fluid passage 65 to cause lateral force $F_L$ to act in substantially the same direction as side load $L_S$, thereby reducing the needed magnitude of lateral force $F_L$. While flow impedance member 98 has been illustrated as being integrally formed as a part of motor frame 60, it should now be understood that flow impedance member 98 may alternatively be formed as a separate piece and subsequently bonded to stator 59 or otherwise held stationary within fluid passage 65. It should be noted that the axial location of arrow $F_L$ in FIG. 2 is illustrative only, and that lateral force $F_L$ is applied over an axial range rather than a single point.

In order to allow the pressure gradient within fluid passage 65 to be sufficiently high in magnitude, it may be necessary to provide an axial flow separator 104 within fluid passage 65 at the end of flow impedance member 98 that is proximal to outlet 52, i.e. axial flow separator 104 is between flow impedance member 98 and outlet 52. Axial flow separator 104 is annular in shape and extends radially into fluid passage 65 from stator 59 and provides impedance in the axial flow of the fuel through fluid passage 65. As illustrated, axial flow separator 104 may be formed as a separate piece that is fixed to stator 59, however, axial flow separator 104 may alternatively be integrally formed with stator 59 or otherwise held stationary within fluid passage 65. An axial flow separator flow aperture 106 extends axially through flow impedance member 98, thereby providing a path for fuel to pass through flow impedance member 98 from fluid passage 65 to outlet 52. By the nature of axial flow separator 104 being annular in shape, axial flow separator flow aperture 106 is not centered about axis 24. By axial flow separator 104 impeding the axial flow of fuel through fluid passage 65, a greater lateral pressure gradient can be generated within fluid passage 65, thereby resulting in a greater magnitude of lateral force $F_L$. It should be noted that the size and location of axial flow separator flow aperture 106 can be designed to achieve a desired magnitude of lateral force $F_L$.

Figure 6:
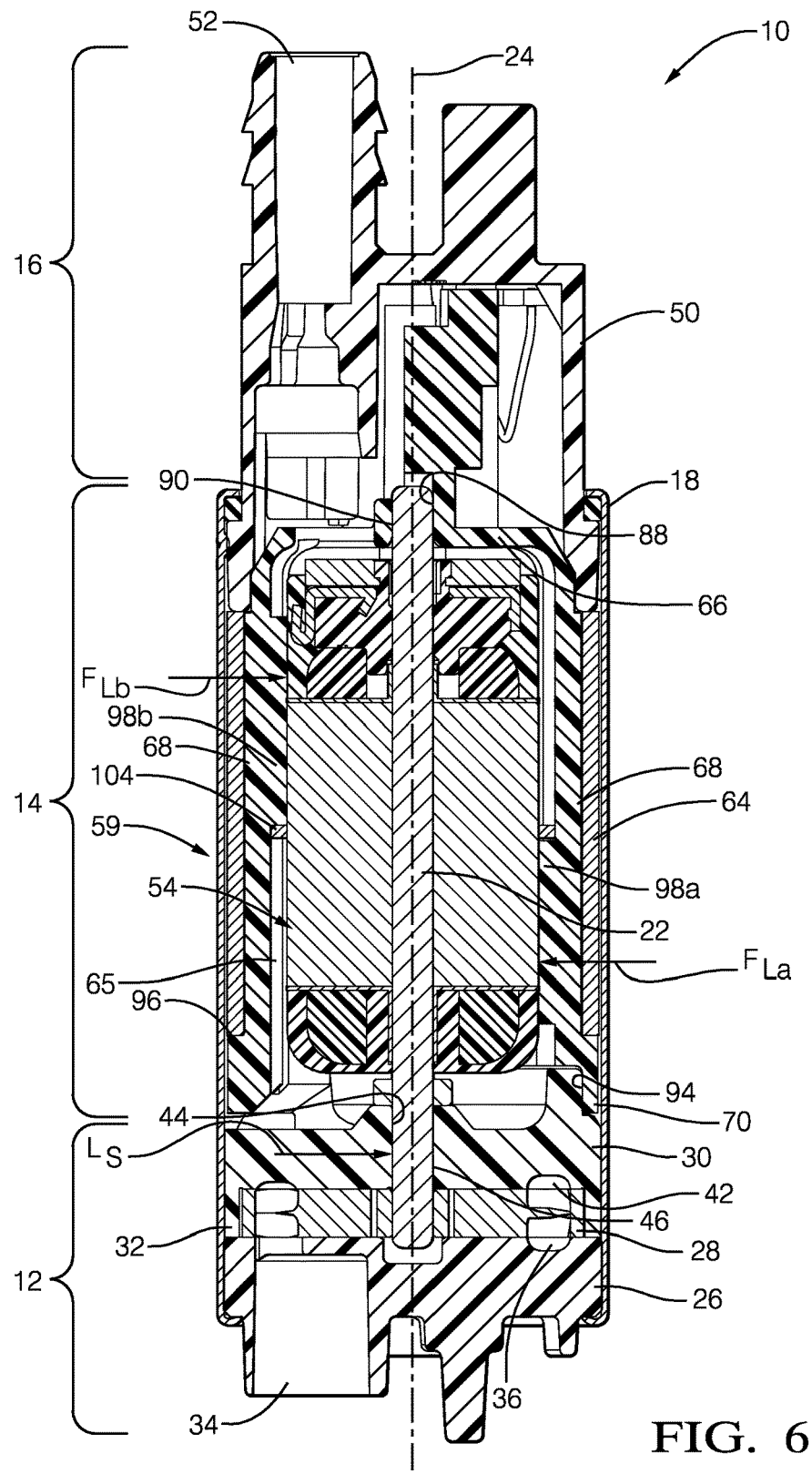
FIG. 6 is the axial cross-sectional view of FIG. 5 showing an alternative arrangement.

In an alternative arrangement, as shown in FIG. 6, flow impedance member 98 may be replaced by a lower flow impedance member 98a and an upper flow impedance member 98b which extend radially into fluid passage 65 from different circumferential locations of stator 59 such that lower flow impedance member 98a extends axially within fluid passage 65 over a different axial range than upper flow impedance member 98b. As shown, lower flow impedance member 98a and upper flow impedance member 98b may extend radially into fluid passage 65 from diametrically opposing locations of stator 59. Also as shown, lower flow impedance member 98a extends axially within fluid passage 65 over an axial range which does not include upper flow impedance member 98b. Since lower flow impedance member 98a and upper flow impedance member 98b are on opposing sides, the area of high pressure generated by lower flow impedance member 98a is circumferentially opposed to the area of high pressure generated by upper flow impedance member 98b, and consequently, lower flow impedance member 98a produces a lower lateral force $F_{La}$ in a direction that is opposite of an upper lateral force $F_{Lb}$ that is generated by upper flow impedance member 98b. Furthermore, since lower flow impedance member 98a and upper flow impedance member 98b cover different ranges axially within fluid passage 65 and are spaced axially relative to each other, lower lateral force $F_{La}$ and upper lateral force $F_{Lb}$ act together to create a moment couple on armature 54, thereby offsetting side load $L_S$ at lower bearing 44 and also offsetting the reaction force of side load $L_S$ at upper bearing 88.

In order to allow a first pressure gradient and a second pressure gradient generated by lower flow impedance member 98a and upper flow impedance member 98b respectively to be sufficiently high in magnitude, axial flow separator 104 may be positioned within fluid passage 65 such that axial flow separator 104 axially separates lower flow impedance member 98a and upper flow impedance member 98b. As described previously, axial flow separator 104 is annular in shape and extends radially into fluid passage 65 from stator 59 and provides impedance in the axial flow of the fuel through fluid passage 65. Also as described previously, an axial flow separator flow aperture 106 extends axially through flow impedance member 98, thereby providing a path for fuel to pass through flow impedance member 98. It should also be noted that multiple axial flow separators 104 may be provided, and by way of non-limiting example only, one axial flow separator 104 may separate lower flow impedance member 98a and upper flow impedance member 98b while another axial flow separator 104 may be positioned at the axial end of upper flow impedance member 98b that is distal from lower flow impedance member 98a.

While this invention has been described in terms of preferred embodiments thereof, it is not intended to be so limited, but rather only to the extent set forth in the claims that follow.

I claim:

1. A fluid pump comprising:
   an inlet for introducing fluid into said fluid pump;
   an outlet for discharging said fluid from said fluid pump;
   a motor having an armature which rotates about an axis such that said armature is supported at one end by a first bearing and at a second end by a second bearing, said motor also having a stator which circumferentially surrounds said armature such that a fluid passage is defined radially between said armature and said stator through which said fluid flows from said inlet to said outlet;
   a pumping arrangement which is rotated by said armature and which pumps said fluid from said inlet to said outlet; and
   a flow impedance member extending axially in said fluid passage which impedes circumferential flow of said fluid within said fluid passage, thereby generating a pressure gradient circumferentially within said fluid passage which applies a lateral force to said armature;
   wherein said fluid pump further comprises an axial flow separator located within said fluid passage which impedes axial flow of said fluid within said fluid passage, wherein said axial flow separator is located between said flow impedance member and said outlet;
   wherein said axial flow separator is annular in shape and includes an axial flow separator flow aperture extending axially therethrough which provides fluid communication from said fluid passage to said outlet.

2. A fluid pump as in claim 1 wherein said axial flow separator flow aperture is not centered about said axis.

3. A fluid pump comprising:
   an inlet for introducing fluid into said fluid pump;
   an outlet for discharging said fluid from said fluid pump;
   a motor having an armature which rotates about an axis such that said armature is supported at one end by a first bearing and at a second end by a second bearing, said motor also having a stator which circumferentially surrounds said armature such that a fluid passage is defined radially between said armature and said stator through which said fluid flows from said inlet to said outlet;
   a pumping arrangement which is rotated by said armature and which pumps said fluid from said inlet to said outlet;
   a flow impedance member extending axially in said fluid passage which impedes circumferential flow of said fluid within said fluid passage, thereby generating a pressure gradient circumferentially within said fluid passage which applies a lateral force to said armature;

wherein said flow impedance member is a lower flow impedance member which impedes circumferential flow of said fluid within said fluid passage, thereby generating a first pressure gradient circumferentially within said fluid passage which applies a lower lateral force to said armature, said fluid pump further comprising:

an upper flow impedance member extending axially in said fluid passage which impedes circumferential flow of said fluid within said fluid passage, thereby generating a second pressure gradient circumferentially within said fluid passage which applies an upper lateral force to said armature;

wherein said lower flow impedance member is located within said fluid passage at a different circumferential location than said upper flow impedance member; and wherein said lower flow impedance member extends axially within said fluid passage over a different axial range than said upper flow impedance member.

4. A fluid pump as in claim 3 wherein said lower flow impedance member extends axially within said fluid passage over a first axial range from a first lower flow impedance member end to a second lower flow impedance member end and said upper flow impedance member extends axially within said fluid passage over a second axial range from a first upper flow impedance member end to a second upper flow impedance member end such that said first axial range does not include said second axial range.

5. A fluid pump as in claim 3 wherein said lower lateral force and said upper later force act together to generate a moment couple on said armature.

6. A fluid pump as in claim 3 wherein said lower flow impedance member and said upper flow impedance member extend radially into said fluid passage from diametrically opposing locations of said stator.

7. A fluid pump as in claim 6 further comprising an axial flow separator located within said fluid passage which impedes axial flow of said fluid within said fluid passage, wherein said axial flow separator is located axially between said lower flow impedance member and said upper flow impedance member.

8. A fluid pump as in claim 7 wherein said axial flow separator is annular in shape and includes an axial flow separator flow aperture extending axially therethrough which provides fluid communication from said fluid passage to said outlet.

9. A fluid pump as in claim 8 wherein said axial flow separator flow aperture is not centered about said axis.

10. A fluid pump as in claim 3 further comprising an axial flow separator located within said fluid passage which impedes axial flow of said fluid within said fluid passage, wherein said axial flow separator is located axially between said lower flow impedance member and said upper flow impedance member.

11. A fluid pump as in claim 10 wherein said axial flow separator is annular in shape and includes an axial flow separator flow aperture extending axially therethrough which provides fluid communication from said fluid passage to said outlet.

12. A fluid pump as in claim 11 wherein said axial flow separator flow aperture is not centered about said axis.

13. A fluid pump as in claim 3 wherein said lower flow impedance member and said upper flow impedance member are fixed to said stator.

14. A fluid pump as in claim 3 wherein said lower flow impedance member is configured to apply said lower lateral force in a direction which is opposite in direction to a side load applied to said armature by said pumping arrangement.

15. A fluid pump as in claim 14 wherein said lower lateral force and said upper later force act together to generate a moment couple on said armature.

* * * * *